United States Patent [19]

Morita et al.

[11] Patent Number: 4,672,621
[45] Date of Patent: Jun. 9, 1987

[54] LASER RESONATOR HAVING AN IMPROVED GAS-INTRODUCING PORTION

[75] Inventors: Yasuyuki Morita, Yokohama; Hidemi Takahashi; Reiji Sano, both of Kawsaki, all of Japan

[73] Assignee: Matsushita Electric Industrial Co., Ltd., Kadoma, Japan

[21] Appl. No.: 484,740

[22] Filed: Apr. 13, 1983

[30] Foreign Application Priority Data

Apr. 13, 1982 [JP] Japan .................................. 57-61604
Apr. 20, 1982 [JP] Japan .................................. 57-66683

[51] Int. Cl.⁴ .......................... H01S 3/22; H01S 3/223
[52] U.S. Cl. ..................................................... 372/58
[58] Field of Search ................................. 372/58, 701

[56] References Cited

U.S. PATENT DOCUMENTS 4,011,522 3/1977 Falk ........................................ 372/58
4,074,208 2/1978 Mack et al. .......................... 372/58
4,351,052 9/1982 Sasaki et al. ......................... 372/58

*Primary Examiner*—Robert E. Wise
*Attorney, Agent, or Firm*—Cushman, Darby & Cushman

[57] ABSTRACT

In a laser resonator having a gas-introducing portion at one end of a laser tube, where the gas introducing portion comprises an inner tube communicating with the laser tube and an outer tube covering the inner tube. The inner tube has a plurality of circumferentially spaced apart flow passages so that a gas mixture fed from a gas source to an annular chamber defined between the inner surface of the outer tube and the outer surface of the inner tube, is led into the inside of the inner tube via the flow passages. As a result, turbulence occurs within the inner tube so that radial distribution of gas flow speed in the laser tube is made uniform, thereby increasing the maximum output and stability. The flow passages may be slits, oval or circular openings, triangular openings or the like. The flow passages may be skewed relative to both the radial and tangential lines passing therethrough or relative to the axis of the inner tube so that the gas introduced inside the inner tube spirals, and therefore the gas travels along the laser tube with a spiral movement.

13 Claims, 19 Drawing Figures

LASER RESONATOR HAVING AN IMPROVED GAS-INTRODUCING PORTION

BACKGROUND OF THE INVENTION

This invention relates generally to laser resonators, and more particularly, the present invention relates to an improvement in the structure of the gas-introducing regions of gas laser resonators.

In conventional gas laser resonators, a gas or gaseous mixture is supplied from a gas source to one or more gas-introducing regions so that the gas mixture is led into a laser tube functioning as an optically resonant cavity. The structure of such an introducing region is known as a double tube introducer in which an electrode is mounted. When the gas mixture is led into the laser tube via such a double tube introducer, the gas uniformly flows into the laser tube, and therefore, the gas mixture is apt to be concentrated at the center of the circular cross-section of the laser tube. As a result, the flow rate or speed of flow of the gas mixture is not uniform throughout the entire area of the circular cross-section, and therefore, the discharging point is concentrated at a limited point around an electrode. Therefore, the temperature of the electrode is apt to be high, while sufficient laser output cannot be expected due to the small discharging area or volume within the laser tube. Moreover, since the discharging point moves irregularly, the output level varies accordingly, and sometimes discharging undesirably terminates. For this reason, it is difficult to increase the pressure of the gas mixture or to increase the electrical power applied to the laser tube. Namely, the above-mentioned conventional laser resonators have sufferd from the problem that they have to operate with a low power output value.

SUMMARY OF THE INVENTION

The present invention has been developed in order to remove the above-described drawbacks inherent to the conventional laser resonators.

It is, therefore an object of the present invention to provide a new and useful laser resonator which is capable of operating with high stability and high output power.

According to a feature of the present invention, a plurality of circumferentially spaced apart flow passages are made in an inner tube constituting a double tube introducing portion of a laser resonator. Since a gas mixture is led into the inside of the inner tube via the plurality of flow passages, which may be slits or openings of suitable shape, turbulence occurs inside the inner tube. As a result, radial distribution of gas flow speed throughout the entire area of the circular cross-section is substantially uniform, thereby increasing the maximum output power with high stability.

According to another feature of the present invention, each slit or opening is so inclined or skewed so that a swirl of gas occurs within the inner tube. Due to such a swirl the gas travels along the laser tube with a spiral movement. As a result, the distribution of gas flow speed is substantially uniform throughout the entire circular cross-section of the laser tube at not only an upstream portion but also a downstream portion within the laser tube.

In accordance with the present invention there is provided a laser resonator comprising: a laser tube means; a reflector means arranged at both sides of said laser tube; at least one gas introducing portion connected to one end of said laser tube means, said gas introducing portion having an inner tube communicating with one end of said laser tube means, and having a plurality of circumferentially spaced apart flow passages around one end of said inner tube, at which one end of said inner tube communicates with said laser tube, and an outer tube coaxially arranged with said inner tube so as to partly cover said inner tube and to define an annular chamber between the inner surface of said outer tube and the outer surface of said inner tube, said annular chamber communicating with a gas source; and at least one gas exhausting portion communicating with said laser tube for feeding back the exhausted gas from said laser tube to said gas source.

BRIEF DESCRIPTION OF THE DRAWINGS

The object and features of the present invention will become more readily apparent from the following detailed description of the preferred embodiments taken in conjunction with the accompanying drawings in which.

The same or corresponding elements and parts are designated by like reference numerals throughout the drawings.

DETAILED DESCRIPTION OF THE PREFERRED EMBODIMENT

Prior to describing preferred embodiments of the present invention, the above-discussed conventional laser resonator will be further described for a better understanding of the present invention.

Figure 1:
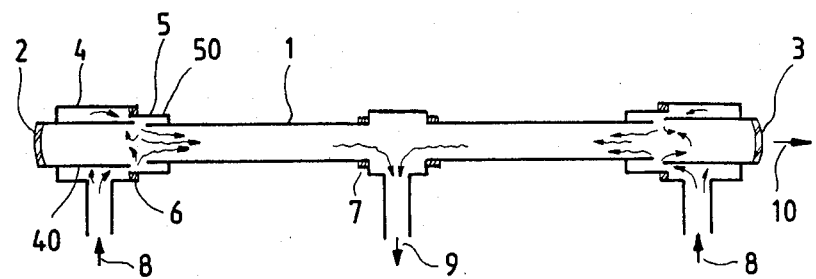
FIG. 1 is a schematic cross-sectional view showing a conventional gas laser resonator.

FIG. 1 illustrates a conventional gas laser resonator of the gas-flowing type. The reference 1 indicates a laser tube; 2, a reflecting end plate capable of total reflection; and 3, a partially reflecting end plate. These members 1-3 constitute an optical resonator. The reference 4 indicates an outer tube of a gas inlet or introducing portion; and 40, an inner tube. The outer and inner tubes 4 and 40 are coaxially arranged so that the gas inlet portion is formed of a double tube structure. The reference 5 indicates a gap between an open end of the inner tube 40 and an open end of the laser tube 1. The reference 50 indicates an annular chamber which makes gas flow smooth. The reference 6 indicates an electrode having a cylindrical or pin like shape. The reference 7 indicates another electrode of a polarity opposite to that of the above-mentioned electrode 6. Arrows 8 and 9 indicate the direction of gas flow, and another arrow 10 indicates a laser output emitted through the partially reflecting end plate 3.

In the illustrated example, the gas mixture is fed into the laser tube 1 via both ends of the resonator as indicated by arrows 8, and the gas mixture flows along the outer surface of the inner tube 40 so that the gas mixture is led via the gap 5 into the laser tube 1. The gas led into the laser tube 1 is exhausted from a center outlet in the direction of arrow 9. Discharge occurs between the electrodes 6 and 7. The path of gas flow and discharging between the two electrodes is symmetrical with respect to the center outlet, and therefore, description thereof will be made with respect to the left half.

Figure 2:
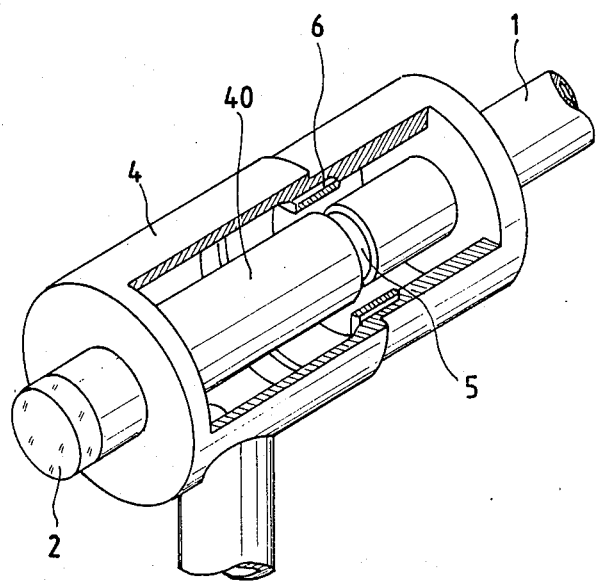
FIG. 2 is a schematic perspective view of a gas introducing portion used in the laser resonator of FIG. 1.
Figure 3:
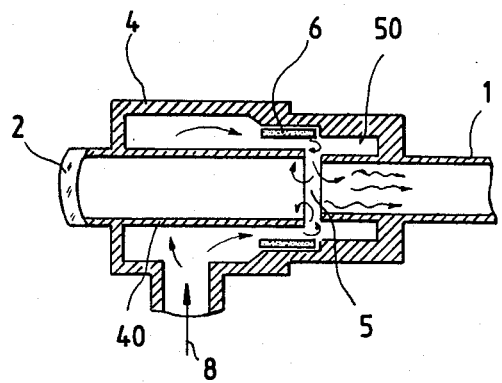
FIG. 3 is a schematic cross-sectional view of the gas introducing portion of FIG. 2.

FIG. 2 illustrates an enlarged perspective view of the gas introducing portion shown in FIG. 1, and FIG. 3 illustrates an enlarged cross-sectional view of the same. As illustrated in FIGS. 2 and 3, the gas induced into the introducing portion enters into the inside of the laser tube 1 via the annular gap 5, the path of the gas entering is uniform throughout the circumference of the laser tube 1. As a result, the gas is apt to be concentrated at the center of the circular cross-section, i.e. around the longitudinal axis of the laser tube 1. This results in fast flow of the gas around the axis and slow flow in the vicinity of the inner surface of the laser tube 1. Therefore, the gas flow rate or speed of gas flow is not uniform throughout the entire area of the circular cross-section within the laser tube 1, and this causes the electrode 6 to discharge from a particular point thereon. In other words, only a small portion of the electrode 6 contributes to discharging, while most portions thereof do not contribute to discharging. Therefore, the discharging volume is small, resulting in low output power. Furthermore, the above-mentioned various disadvantages arise due to such irregular distribution of flow speed within the laser tube 1.

Figure 4:
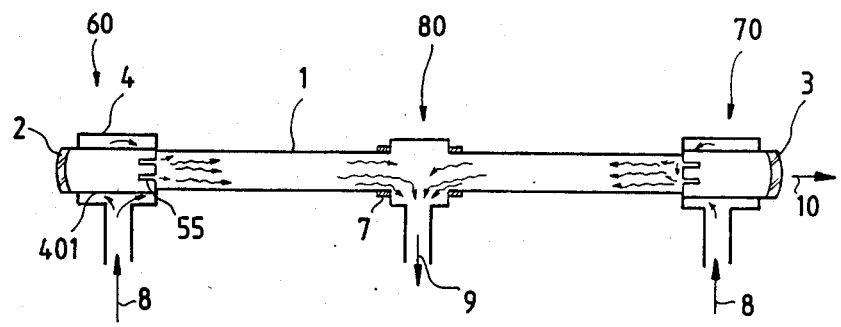
FIG. 4 is a schematic cross-sectional view of an embodiment of the gas laser resonator according to the present invention.

Reference is now made to FIG. 4 which shows a schematic side cross-sectional view of a laser resonator according to the present invention. Although the following embodiments will be described by way of an example of a laser resonator having two gas inlets, one at each end and an outlet at a midway point between two inlets, the invention is not limited to such an arrangement. Namely, the present invention may be applicable to laser resonators of other types, for instance one having a single gas inlet at a midway point between both ends of the laser tube or one having an inlet at one end and an outlet at the other end.

The laser resonator of FIG. 4 comprises a laser tube 1, and two gas introducing portions 60 and 70 at each end of the laser tube 1. The laser tube 1 has an outlet or exhausting portion 80 at the middle thereof between its respective ends. The first gas introducing portion 60 comprises an inner tube 401 and an outer tube 4 coaxially arranged with the inner tube 401 such that the outer tube 4 partly covers the inner tube 401. A reflecting end plate for total reflection is disposed at one end of the inner tube 401. The second gas introducing portion 70 comprises an inner tube 401' and an outer tube 4' coaxially arranged with the inner tube such that the outer tube 4' partly covers the inner tube 401'. A partially reflecting end plate 3 is disposed at one end of the inner tube 401'. Each of the outer tubes 4 and 4' has an inlet which communicates with a conduit through which a gas mixture is fed from an unshown gas source. The gas supplied into the laser tube 1 via both gas introducing portions 60 and 70 is exhausted from the outlet 80 so as to fed back to the gas source. Arrows 8 and 9 respectively indicate the directions of gas flow.

Figure 5:
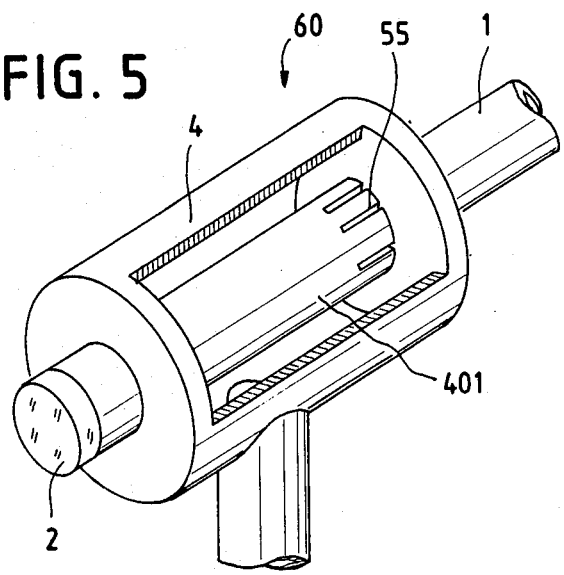
FIG. 5 is a schematic perspective view of a gas introducing portion used in the laser resonator of FIG. 4.
Figure 6:
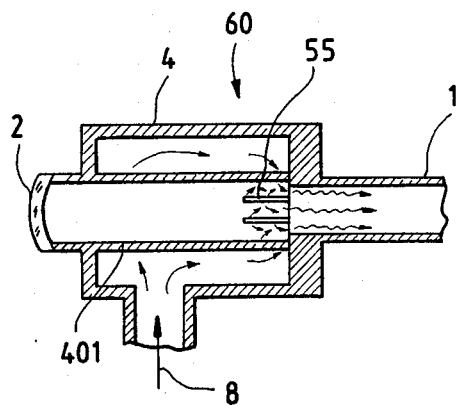
FIG. 6 is a schematic cross-sectional view of the gas introducing portion of FIG. 5.

As best seen in an enlarged perspective view of FIG. 5 and an enlarged cross-sectional view of FIG. 6, which show the first gas introducing portion 60 of FIG. 4, the embodiment of the present invention differs from the conventional example of FIGS. 1-3 in that the inner tube 401 comprises a plurality of coupling paths or flow passages 55 through which the gas outside the inner tube 401 is led into the inside thereof. The inside of the inner tube 401 communicates with one end of the laser tube 1 so that gas fed through the flow passages 55 is led into the laser tube 1. The embodiment further differs from the conventional arrangement in that the inner tube 401 also functions as an electrode. To this end the inner tube 1 is made of a conductive material, such as copper, titanium or the like.

The flow passages 55 are actualized by way of a plurality of slits or openings. In the illustrated embodiment, the slits 55 are equidistantly or equiangularly spaced apart along the circumference of the inner tube 401, and each slit extends in a direction parallel to the axis of the inner tube 1. Furthermore, each slit 55 is made at one end of the inner tube 401, at which end the inner tube 401 communicates with the laser tube 1. Since the structure of the other inner tube 401' of the second gas introducing portion 70 is substantially the same as the above, description thereof is omitted.

The embodiment of FIGS. 4-6 operates as follows: When a gas mixture is supplied under pressure to the gas introducing portion 60 from the gas source, the gas led into the annular chamber defined between the outer surface of the inner tube 401 and the inner surface of the outer tube 4 is forcibly led via the plurality of flow passages 55 into the inside of the inner tube 401 and the laser tube 1. Therefore, at the inside of the inner tube 401, there occurs a difference in pressure between portions where the flow passages 55 exist and remaining portions where no flow passages 55 exist. Furthermore, the gas flows entering into the inside of the inner tube 401 collide with each other within the inner tube 401. Due to the pressure difference and the collision between gas flowing from the different flow passages 55, a turbulence occurs inside the inner tube 401. Such a gas turbulence within the inner tube 401 results a uniform distribution of speed of gas flow throughout the entire area of the circular cross-section of the laser tube 1 because the gas flow is prevented from being concentrated at the center of the cylindrical; laser tube 1. As a result, the discharging point is prevented from being concentrated at a small area so that the discharging volume expands uniformly within the entire area of the inside of the laser tube 1 in which a resultant laser beam propagates. Accordingly, the output power level can be increased when compared to the above-mentioned conventional arrangement. As a result of the occurrence of the gas turbulence and due to the cooling effect for the gas and the electrode 6 caused by adiabatic expansion, which results from the introduction of the gas via narrow flow passages 55 to the large diameter laser tube 1, it is now possible to apply greater electrical power. Therefore, the output variation, which is caused by unstable discharging, can be remarkably reduced. Consequently, it is possible to obtain a high output with high stability.

According to the inventor's experiments a desired gas turbulence has occurred when the slit has approximately a 2 millimeter width and approximately a 20 millimeter length, while the inner diameter of the inner tube 1 is approximately 16 millimeters, and the length of the laser tube 1 is approximately 600 millimeters and a gas mixture of $CO_2$, $N_2$ and He mixed at a ratio of 1:3:18 is applied.

Figure 7:
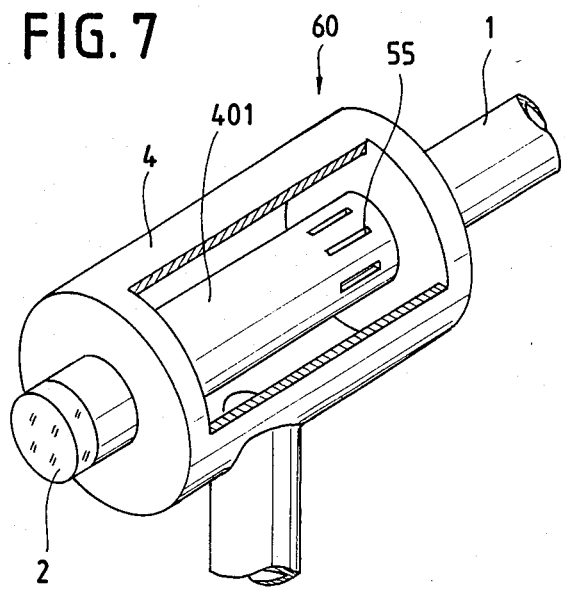
FIGS. 7, 8, 9 and 10 are schematic perspective views showing various modifications of the embodiment of FIGS. 4-6.

FIG. 7 shows a modification of the above-described embodiment of FIGS. 4-6. In this modification, the location of the plurality of flow passages 55 is changed so that the flow passages 55 are positioned at a small distance from the end of the laser tube 1. The modified laser resonator of FIG. 7 operates in the same manner as the above-described embodiment so that a similar effect results. Namely, the location of the flow passages 55 or slits is not limited to the very end of the inner tube 401. In other words, the plurality of flow passages 55 may be provided at any positions as long as they are close to the end of the inner tube 401, at which end the inner tube 401 communicates with the laser tube 1.

Although each of the flow passages 55 has been shown as a slit or a rectangular opening above, the shape of the flow passage is not limited to such an example. Namely, other shapes, such as an oval, circle, triangle, etc. may be applicable.

Figure 8:
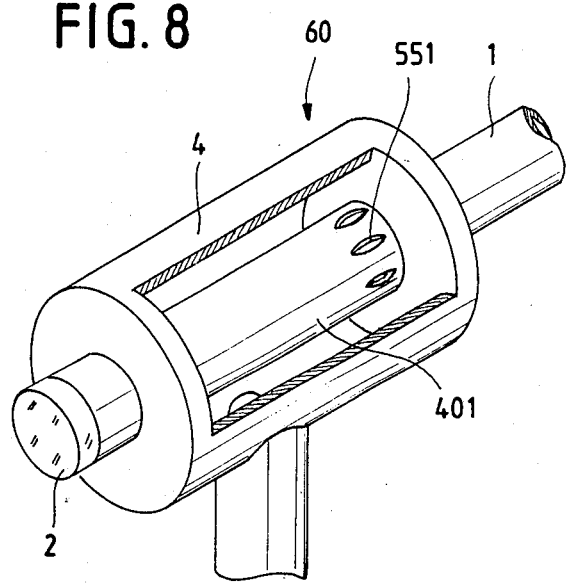
Figure 9:
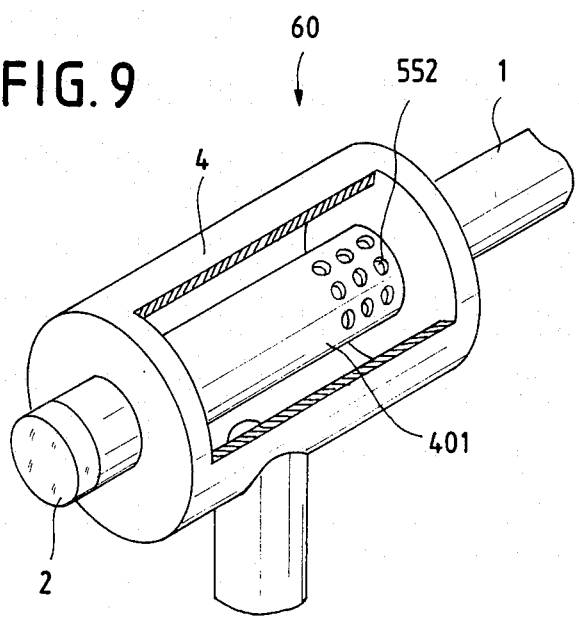
Figure 10:
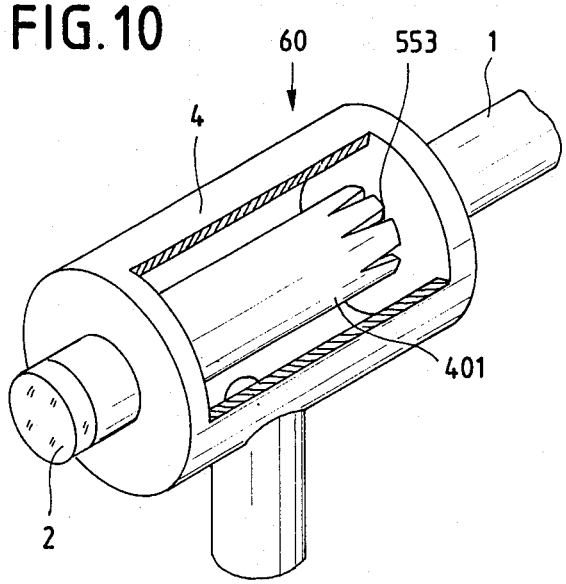

Hence, reference is now made to FIGS. 8-10 which respectively show various modifications of the above embodiment. In the arrangement of FIG. 8, each flow passage, which is designated at the reference 551, has an elongated oval opening where the longitudinal direction thereof is parallel to each other and also parallel to the axis of the inner tube 401. In another arrangement of FIG. 9, each flow passage, which is designated at the reference 552, has a plurality of circular openings aligned in line, where axes each passing through the plurality of circular openings is parallel to each other and also parallel to the axis of the inner tube 401. In a further arrangement of FIG. 10, each flow passage, which is designated at the reference 553, has a triangular or wedge shaped opening where the longitudinal direction thereof is parallel to each other and also parallel to the axis of the inner tube 401.

Figure 11:
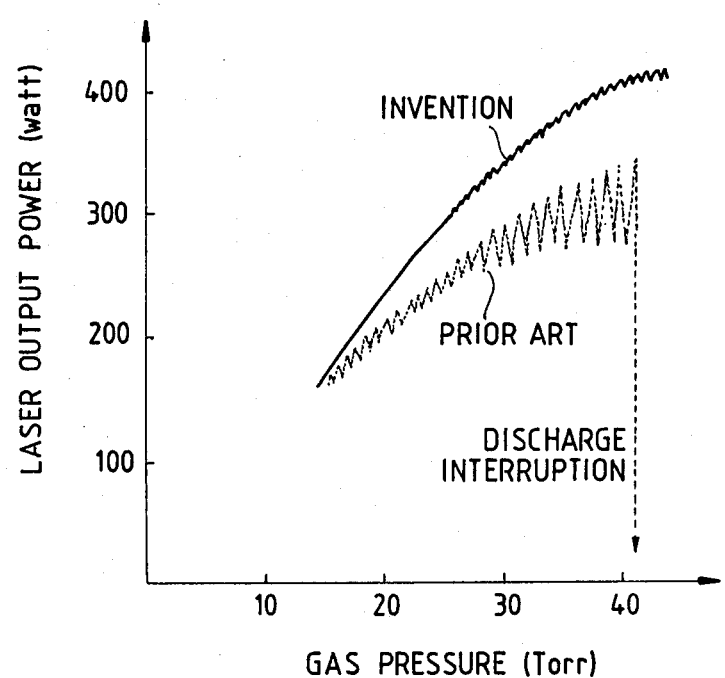
FIG. 11 is a graphical representation showing the difference in laser output characteristic with respect to gas pressure between the conventional laser resonator of FIGS. 1-3 and the laser resonator according to the embodiment of FIGS. 4-6.

Reference is now made to FIG. 11 showing the difference in characteristics between the conventional laser resonator of FIGS. 1-3 and the present invention laser resonator of FIGS. 4-7. FIG. 11, is a graphical representation of laser outputs from these two laser resonators with respect to gas pressure. A solid curve indicates the output characteristic of the present invention laser resonator, while a dotted curve indicates the same of the conventional one. Each of the curves fluctuates up and down within their variation ranges. As will be understood from the comparison between these two curves in FIG. 11, the laser output resulting from the laser resonator according to the present invention hardly fluctuates as the gas pressure raises, while the laser output resulting from the conventional laser resonator drasticaly varies. The drastic variation in output power in the conventional laser resonator is remarkable when the discharging point changes or moves from one to another so that a spike-like output variation results. Accordingly, discharge in the conventional resonator is apt to terminate when the gas pressure is increased beyond a given value, while discharge in the present invention resonator is continuously effected irrespective of the increase in gas pressure.

In the above-described embodiments of the present invention, although the inner tube 401 has been described which also functions as an electrode, the inner tube 401 may be arranged so that an electrode is separately provided as shown in FIGS. 1-3. However, when the inner tube 401 functions as an electrode as described above, discharge is smoothly and uniformly effected because the gas within the laser tube 1 is readily in contact with the electrode 6.

According to the present invention there is no need to provide a chamber such as that 50 in FIGS. 1-3 because the gas outside the inner tube 401 is only needed to be led into the inside of the inner tube 401 while there is no need to consider the smooth flow of the gas into the inside of the inner tube 401. Inasmuch as the chamber 50 is unnecessary in the arrangement according to the present invention, the peripheral portions of the laser tube 1 close to both ends thereof are not covered by the gas introducing portion 60 or 70. As a result, the outer surface of the laser tube 1 can be exposed to an unshown coolant at an area which is greater than that in the conventional arrangement. This makes the cooling efficiency high, and therefore a higher output can be expected when compared to the conventional arrangement.

Figure 12:
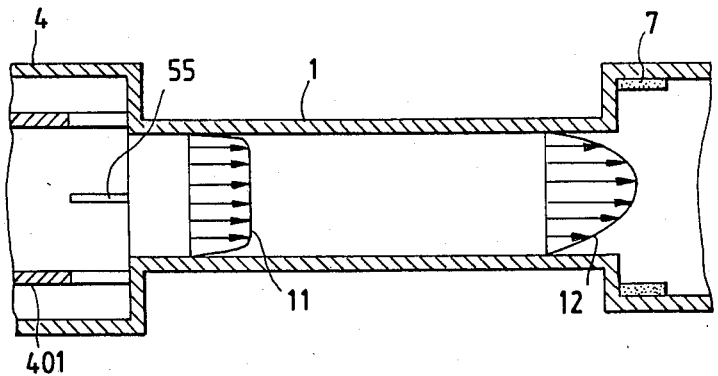
FIG. 12 shows the distribution of speed of gas flow within the laser tube of the embodiment of FIGS. 4-6.

Although the distribution in gas flow speed at various portions within the laser tube 1 is almost ideal according to the present invention, such an ideal distribution can be mainly obtained in the vicinity of the gas inlet portions of the laser tube 1, i.e. around both the ends of the laser tube 1 in the illustrated embodiments. Since the gas flow is subjected to resistance from the inner surface or tube wall of the laser tube 1, the gas flow is like a laminar flow at a position close to the outlet portion 80. The above-described path of gas flow in the laser tube 1 is shown in FIG. 12. If such a variation in gas flow can be reduced, a higher output can be expected, while the path of discharging is further uniform throughout the entire area of the laser tube 1.

Figures 13A, 13B:
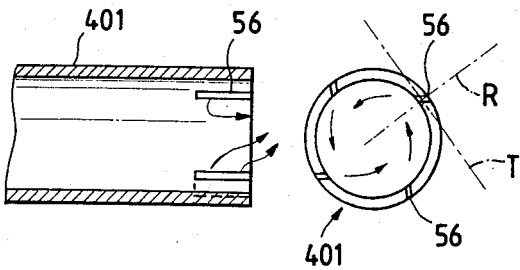
FIGS. 13A and 13B are schematic cross-sectional views showing another embodiment of the present invention.

Hence, reference is now made to FIGS. 13A and 13B which show another embodiment of the present invention, in which the path of gas flow within the laser tube 1 has been improved. According to this embodiment, the speed of the flow in the vicinity of the tube wall is increased by way of a particular arrangement of the flow passages so that uniform distribution in flow speed is not lost even at the downstream portion within the laser tube 1. To this end, the gas flow is rotated around the axis of the laser tube 1 as shown in FIGS. 13A and 13B which show schematic views of the inner tube 401.

Figures 14A, 14B:
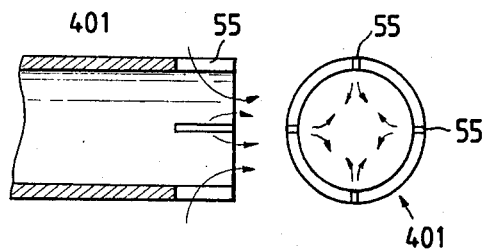
FIGS. 14A and 14B are schematic cross-sectional views showing the gas flow through flow passages used in the embodiment of FIGS. 4-6.

As best seen in FIG. 13B, each of the flow passages, which are designated at the reference 56, is made so that the walls defining each slit or opening extend from the outer surface to the inner surface of the inner tube 401 in a direction other than the radial direction of the inner tube 1. In other words, each of the flow passages 56 is skewed or inclined relative to both the radial and tangential lines R and T passing through the flow passage 56. Therefore, the depth direction of the walls of each slit 56 has a predetermined angle with respect to the radial line R and the tangential line T. FIGS. 14A and 14B respectively show the inner tube 401 used in the first mentioned embodiment of FIGS. 4–6. From the comparison between FIGS. 13A and 13B and FIGS. 14A and 14B, it will be understood that the gas introduced inside the inner tube 401 via the flow passages 56 of FIGS. 13A and 13B substantially move along the inner wall of the inner tube 401 so that a swirl occurs (see arrows in FIG. 13B). Preferably the plurality of flow passages 56 are equidistantly or equiangularly spaced along the circumference of the inner tube 401.

Figure 15:
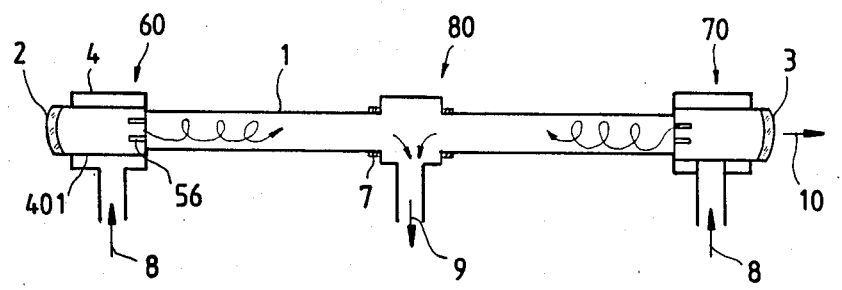
FIG. 15 shows the gas flow along the laser tube in the embodiment of FIGS. 13A and 13B.
Figure 16:
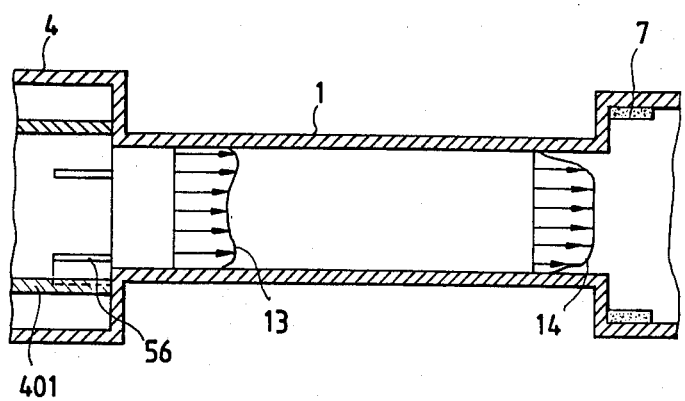
FIG. 16 shows the distribution of speed of gas flow within the laser tube in the embodiment of FIGS. 13A and 13B.

Because of such a swirl of the introduced gas or rotational force applied to the gas, the gas moves in a spiral form toward the downstream of the laser tube 1 as shown in FIG. 15. As the gas spirals to travel downstream, the distribution of the speed of gas flow within the laser tube 1 is improved as shown in FIG. 16. Namely, the speed of flow close to the tube wall is slightly higher than that of flow at the center of the circular cross-section, as indicated by the reference 13, around the entrance or the upstream portion, while the speed of flow is substantially uniform throughout the entire circular cross-section, as indicated by the reference 14, around the exit or the downstream portion.

From the comparison between FIGS. 12 and 16 it will be understood that the distribution of gas flow speed within the laser tube 1 has been improved by arranging the flow passages 56 so that a swirl of gas occurs within the inner tube 401 and the laser tube 1. As a result, a higher output can be achieved, while a further stable operation can be expected.

In the above-described embodiment of FIGS. 13A and 13B, although the flow passages 56 have been arranged such that each slit is skewed or inclined relative to both the radial and tangential lines R and T so as to produce a swirl, other arrangements may be employed for the same purpose.

Figure 17:
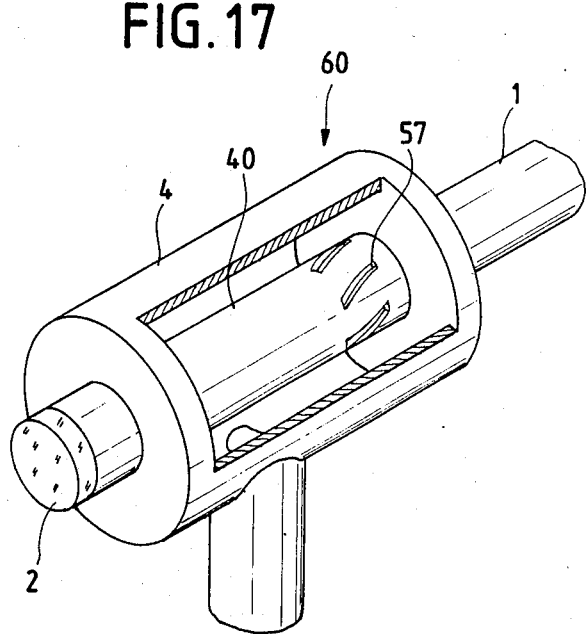
FIG. 17 is a schematic perspective view showing a modification of the embodiment of FIGS. 13A and 13B.

Hence, reference is now made to FIG. 17 which shows a modification of the above embodiment of FIGS. 13A and 13B. The inner tube 401 of FIG. 17 has, as the flow passages, a plurality of rectangular slits 57 whose longitudinal direction extends in a direction different from that of the axis of the inner tube 401. In other words, the slits 57 are not parallel to the axis of the inner tube 501. This means that each of the flow passages 57 is skewed or inclined relative to the axis of the inner tube 401. Although the slits 57 illustrated in FIG. 17 are straight, the longitudinal direction of each slit 57 may be curved if desired. Furthermore, each of the flow passages 57 is not limited to such a rectangular slit. Namely, the aforementioned various arrangements shown in FIGS. 8–10 may be modified so that the gas supplied into the inner tube 401 spirals.

From the above it will be understood that when the flow passages are arranged so that directivity is given to the gas supplied into the inside of the inner tube 401, the gas flow becomes such that a uniform distribution of gas flow speed is obtained throughout the entire area within the laser tube 1.

The above-described embodiments are just examples of the present invention, and therefore, it will be apparent for those skilled in the art that many modifications and variations may be made without departing from the spirit of the present invention.

What is claimed is:

1. In a gas laser having a laser cavity tube, a gas inlet means for causing turbulence in the gas as it is introduced into said laser tube, said gas inlet means comprising said laser tube, a larger tube disposed coaxially around at least one end of said laser tube, a source of laser gas under pressure in communication with said larger tube, and plural passages between said laser tube and the interior of said larger tube circumferentially spaced around said laser tube.

2. A laser resonator as claimed in claim 1, wherein said laser tube is made of a conductive material so as to function as an electrode.

3. A laser resonator as claimed in claim 2, wherein said laser tube is made of copper.

4. A laser resonator as claimed in claim 2, wherein said laser tube is made of titanium.

5. A laser resonator as claimed in claim 1, wherein each of said passages is a rectangular slit whose longitudinal direction is parallel to the axis of said inner tube.

6. A laser resonator as claimed in claim 1, wherein each of said passages is an oval opening whose longitudinal direction is parallel to the axis of said laser tube.

7. A gas laser as claimed in claim 1, wherein each of said passages is a circular opening, a plurality of said circular openings being aligned in line in a direction parallel to the axis of said laser tube, a plurality of sets of openings being arranged along a circumference of said laser tube.

8. A gas laser as claimed in claim 1, wherein each of said passages is a triangular opening whose longitudinal direction is parallel to the axis of said laser tube.

9. A gas laser as claimed in claim 1, wherein each of said passages is made at the very end of said laser tube.

10. A gas laser as claimed in claim 1, wherein each of said passages is made at a position close to the end of said laser tube.

11. A laser resonator as claimed in claim 1, wherein each of said passages is skewed relative to the radial and tangential lines passing therethrough.

12. A gas laser as claimed in claim 1, wherein each of said passages is skewed relative to the axis of said laser tube.

13. A gas laser as claimed in claim 1, wherein each of said passages are equiangularly spaced apart along the circumference of said laser tube.

* * * * *